Patented Mar. 1, 1927.

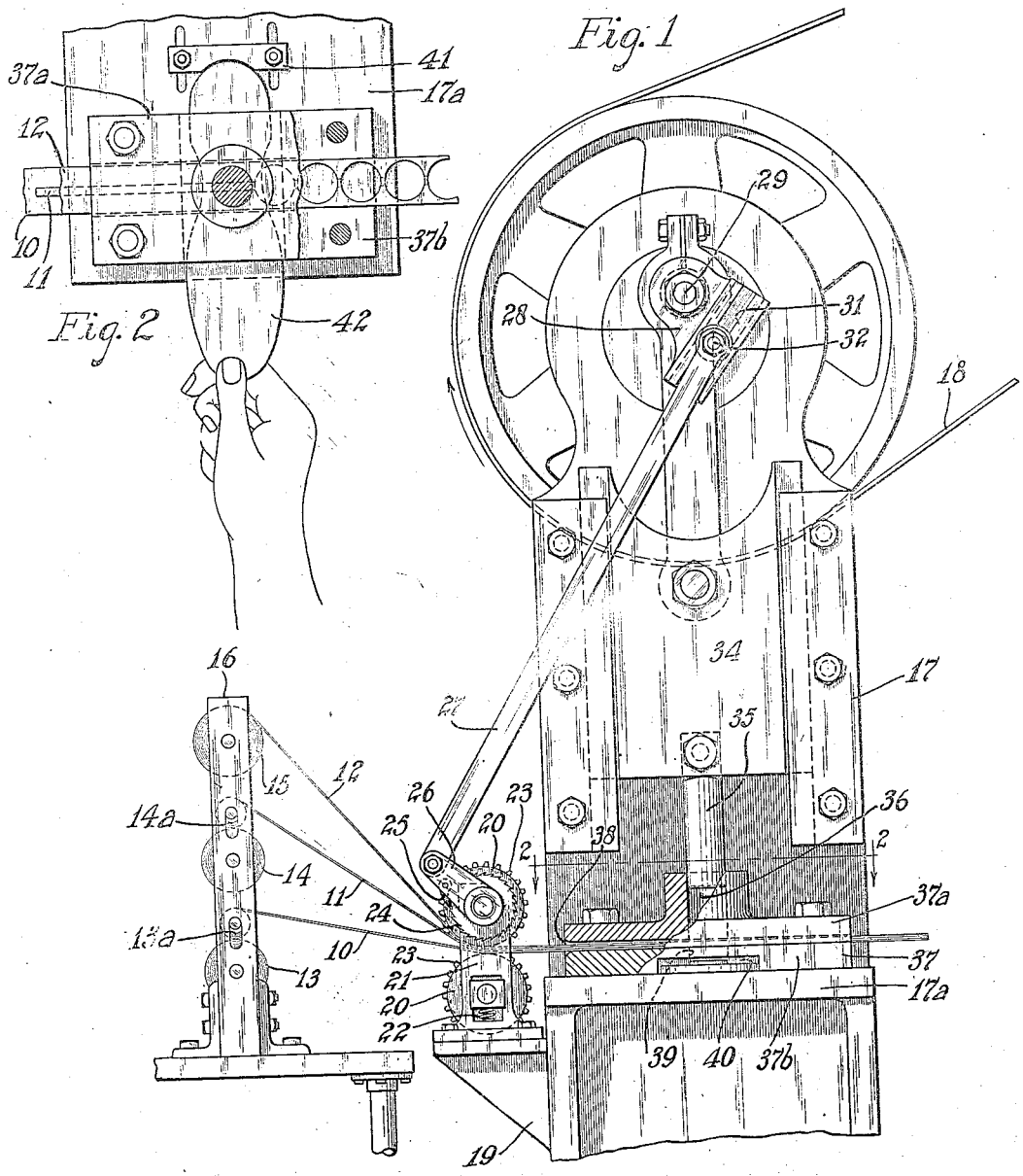

1,619,354

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD OF AND APPARATUS FOR MAKING AND APPLYING MARKERS FOR RUBBER ARTICLES.

Application filed February 6, 1924. Serial No. 691,066.

This invention relates to the art of marking or labeling rubber articles and the like, as by attaching a marker or label to the article and uniting it therewith by vulcanization. It is particularly of value, in the manufacture of rubber articles such as footwear, for forming and applying rubber labels of two or more colors.

My general object is to provide improved, labor-saving and time-saving procedure and apparatus for marking articles such as rubber shoes or other goods. A more specific object is to provide simple and efficient procedure and apparatus for the production of multi-colored blanks of plastic material such as unvulcanized rubber. A further specific object is to form such a blank or label and attach it to the article in a single operation. Another specific object is to provide an unvulcanized label assembly adapted to withstand handling before it is vulcanized or otherwise finally associated with the article, and to be readily united with the article to provide a clear-cut and durable mark thereon.

Of the accompanying drawings:

Fig. 1 is a front elevation of apparatus embodying and adapted to carry out my invention in its preferred form.

Fig. 2 is a sectional plan view on line 2—2 of Fig. 1.

Fig. 3 is a plan view of a label and a metal backing member thereon, part of the latter being broken away for clearness of illustration.

Briefly, my invention, in the specific form herein described, comprises superposing, in the order given, a relatively wide base-strip of unvulcanized rubber, one or more relatively narrow strips of unvulcanized rubber, which may be of a color or colors contrasting with that of said base-strip, and a relatively wide strip of thin sheet metal such as tin, the several strips preferably being drawn from respective sources of supply and progressively associated by rolling pressure; then punching out successive label assemblies from the composite strip and, preferably in the same operation, pressing each label, with the metal backing member thereon punched from said sheet metal, onto an unvulcanized rubber article; thereafter securing the label to the article by vulcanization; and then removing the metal backing member from the vulcanized label.

Referring to the drawings, 10 is a relatively wide strip of unvulcanized rubber, 11 is a relatively narrow and preferably thin strip of unvulcanized rubber of a different color, and 12 is a strip of sheet metal such as tin, its width being substantially the same as that of the strip 10. For supplying said strips, respective supply rolls 13, 14 and 15 are journaled in an upright frame 16. Liner re-winding rolls 13ª and 14ª, journaled in the frame 16, are provided for reeling the liners with which the respective rubber strips are interwound, the rewinding rolls riding upon and being driven by the stock rolls in a manner well known. Although I have shown but two rubber strips, I may use any suitable number of rolls to obtain the color combination desired.

Adjacent the support 16 is a punch press 17, having the usual drive belt 18, and adapted to be actuated at the will of an operator, by suitable means such as the usual foot-treadle (not shown). Mounted upon a bracket 19, projecting from the punch press toward the frame 16, is a pair of intermittently driven presser rollers 20, 20, journaled in a frame 21, the lower presser roller having slidable journals which are yieldingly urged upward by compression springs, one of which is shown at 22. The rollers 20 are adapted to withdraw the rubber strips 10 and 11 and the metal strip 12 from the stock rols, press them adhesively together, and feed them, in successive movements, to the punch press.

For providing the intermittent feeding movement, the rollers 20 are provided with intermeshed gears 23, 23, and the upper roller 20 has its hub provided with a ratchet 24 which is engaged by a spring-pressed pawl 25 on an oscillating crank or pawl-carrier 26, said crank being pivoted on the shaft of said upper roller, and connected by a link 27 to clamping member, 28, non-rotatably secured to the pitman-actuating crank-pin 29 of the punch press. The clamping member 28 is formed with an undercut slot 31 in which the crank pin, 32, of the link 27 is slidably mounted and adjustably clamped in a well known manner, said slot being so disposed with relation to the crank-pin 29 that the crank pin 32 may be adjusted therein to vary the length of successive movements of the composite strip fed to the press by the rollers 20, while preserving the proper timed relation of the feeding movement and the punching operation.

Secured in the bottom of the cross-head 34 of the press is a punch 35, the lower end face of which may be formed with lettering or a design, either in relief or in intaglio, and said punch is fitted to slide within a vertical guide aperture 36 formed in a die block 37 mounted on the lower head 17ª of the punch-press 17. The die block, for convenience of construction, may consist of an upper member 37ª formed with a longitudinal slot or work-guiding passage 38, intersecting the guide aperture 36, and a lower die member, 37ᵇ, formed with a die aperture 39 adapted to admit the punch 35. The lower portion of said lower die member is formed with a transverse slot or passage 40, into which the die aperture 39 opens, said passage being adapted to admit the article to which the label is to be applied. An adjustable gauge or stop 41 (Fig. 2) is mounted on the lower press head 17ª behind and in alignment with the slot 40, for positioning an article, such as a rubber shoe sole 42, inserted in said slot.

In the operation of the apparatus, the strips 10, 11, and 12 are drawn from their respective supply rolls and started, in superposed relation, through the presser rollers 20, by which they are pressed adhesively together to form a composite strip, the latter being threaded on through passage 38 in the die block 37, as shown in Fig. 1. The operator then inserts an article, such as the shoe-sole 42, into the slot 40 and actuates the press, thus causing the punch 35 to descend and cut a blank assembly 43 from the composite strip as the punch passes into the die aperture 39. The stroke of the punch press and the length of the punch are such that said punch carries the blank 43 entirely through the die aperture 39, presses it forcibly upon the article 42, to which it adheres, and stamps the blank assembly with the design of the end face of the punch, the metal backing member of the blank assembly and the underlying rubber compound being formed and imprinted as a unit. The construction as described being such as to actuate the rollers 20 while the punch is out of contact with the work, successive articles are placed under the die black 37 and the machine actuated with relation to each as described, the composite strip being automatically advanced at each operation, and a blank assembly stamped therefrom, embossed or imprinted, and stuck to the article.

The article is then vulcanized with the blank assembly thereon, the metal ply or backing member of the latter serving to protect the design of the blank during the handling of the article, as in the case of building the sole member here shown into an overshoe, and during vulcanization said backing member serves as a mold for the label or marker, from which it is removed after vulcanization.

The speed of operation is limited only by the time required for the operator to remove the labeled article and replace it with an unlabeled one. The labels do not require to be partly vulcanized before use, as is the case with molded rubber labels as commonly used, and better adhesion of the label to the article consequently is obtained, and this without the use of cement. Much work is saved in the matter of assembling and manipulating the labels.

Modifications may be resorted to without departing from the scope of my invention, and I do not wholly limit my claims to the specific form thereof herein described.

I claim:

1. The method of forming marker assemblies which comprises superposing plies of vulcanizable material of different characteristics and different widths to form a laminated structure striated upon its display face, superposing thereon a piece of deformable sheet material to form a composite sheet, and punching a blank from said composite sheet.

2. The method of forming marker assemblies which comprises superposing plies of plastic material of different colors and different widths to form a laminated structure presenting striations of different colors upon its display face, superposing thereon a piece of deformable sheet material to form a composite sheet, and concurrently die-cutting and imprinting a blank from said composite sheet.

3. The method of forming marker assemblies which comprises progressively uniting strips of plastic material of different colors and different widths and a strip of deformable sheet material by rolling pressure to form a composite strip, and die-cutting blanks from said composite strip.

4. The method of forming marker assemblies which comprises progressively uniting and intermittently feeding a strip of plastic material and a strip of sheet metal by rolling pressure, and die-cutting successive blanks from the resulting composite strip, between successive feeding movements of the latter.

5. The method of forming and applying marker assemblies which comprises superposing a piece of deformable sheet material upon a sheet of plastic material, and concurrently die-cutting a blank from the resulting composite structure and sticking said blank to an article.

6. The method of forming and applying marker assemblies which comprises superposing a piece of sheet metal upon a sheet of plastic material, and concurrently die-cutting a blank from the resulting composite structure, imprinting the sheet metal and the plastic material of said blank as a unit, and sticking said blank to an article.

7. The method of forming and applying marker assemblies which comprises progressively uniting and feeding to a die-cutting station strips of plastic material of different characteristics and a strip of sheet metal, and concurrently, at said station, die-cutting successive blanks from the resulting composite strip, imprinting the sheet metal and the plastic material of each blank as a unit, and sticking the die-cut and imprinted blanks to respective articles in succession.

8. Apparatus for forming marker assemblies, said apparatus comprising means for progressively uniting and feeding, by rolling pressure, a strip of plastic material and a strip of deformable sheet material, and die-cutting means adapted to receive the resulting composite strip from the first said means.

9. Apparatus for forming marker assemblies, said apparatus comprising means for progressively uniting and feeding, by rolling pressure, a strip of plastic material and a strip of deformable sheet material, and die-cutting means adapted to receive the resulting composite strip from the first said means, said die-cutting means including a punch having an embossed end face adapted to imprint a blank cut by said punch from said composite strip.

10. Apparatus for forming marker assemblies and applying the same to articles, said apparatus comprising a punch press, a punch therein having an embossed end face, a die-member formed with a die-aperture to receive said punch, means for supporting an article in position to have pressed thereon by said punch a blank forced by said punch through said die aperture, a pair of presser rolls adjacent said press and adapted to feed the work thereto, means for actuating said press, means for intermittently driving said rolls in timed relation to the action of said press, and means for supplying a plurality of strips of sheet material from different directions to said rolls.

In witness whereof I have hereunto set my hand this 5th day of February, 1924.

FRANK J. MacDONALD.